United States Patent [19]

Clayton

[11] Patent Number: 4,546,515
[45] Date of Patent: Oct. 15, 1985

[54] SCOURING PAD AND METHOD FOR PRODUCING SAME

[75] Inventor: William J. Clayton, Fairport, N.Y.

[73] Assignee: Mobil Oil Corporation, New York, N.Y.

[21] Appl. No.: 530,323

[22] Filed: Sep. 8, 1983

[51] Int. Cl.[4] ............................................. A47L 13/04
[52] U.S. Cl. ................... 15/209 C; 29/4.5 B; 428/285
[58] Field of Search ............... 15/209 B, 209 C, 118; 29/4.5 B; 156/303.1, 308.2; 428/285

[56] References Cited

U.S. PATENT DOCUMENTS

| | | |
|---|---|---|
| 1,446,998 | 2/1923 | Vincent . |
| 2,395,054 | 2/1946 | Levine . |
| 2,395,068 | 2/1946 | Rimer . |
| 2,497,206 | 2/1950 | Bruce et al. ............... 15/209 C |
| 2,896,242 | 7/1959 | Winch . |
| 3,014,233 | 12/1961 | Gibbons . |
| 3,034,169 | 5/1962 | Vitale et al. . |
| 3,050,414 | 8/1962 | Reilly ........................... 117/98 |
| 3,097,387 | 7/1963 | Perkovich ................... 15/209 C |
| 3,103,031 | 9/1963 | Winston . |
| 3,104,915 | 9/1963 | Perkovich et al. ........ 15/209 C X |
| 3,256,583 | 6/1966 | Mills ............................ 29/4.5 B |
| 3,261,675 | 7/1966 | Cameron ........................ 51/293 |
| 3,324,500 | 6/1967 | Fuller et al. . |
| 3,338,742 | 8/1967 | Swain ............................. 117/167 |
| 3,350,735 | 11/1967 | Pratt ............................ 15/104.94 |
| 3,382,058 | 5/1968 | Wise et al. ..................... 51/295 |
| 3,451,758 | 6/1969 | McClain ........................ 401/201 |
| 3,468,096 | 9/1969 | Franz ................................ 53/28 |
| 3,538,569 | 11/1970 | Mills ............................ 29/4.5 B |
| 3,581,447 | 6/1971 | Falivene ......................... 51/400 |
| 4,018,575 | 4/1977 | Davis et al. ..................... 51/295 |
| 4,189,395 | 2/1980 | Bland .............................. 252/91 |
| 4,199,835 | 4/1980 | Heyer et al. ................. 15/209 B |
| 4,241,469 | 12/1980 | Perazzo ........................ 15/209 C |

*Primary Examiner*—Chris K. Moore
*Attorney, Agent, or Firm*—Alexander J. McKillop; Michael G. Gilman; Charles J. Speciale

[57] ABSTRACT

A scouring pad is formed by disposing layers of a thermoplastic resin above and below a layer of metal wool. The resin and metal are compressed and heated to a temperature above the melting point of the resin. The resulting pad has mat-like upper and lower layers of metal fiber and resin, and an interior layer of metal fibers which is substantially free of the resin. The pad has a reduced tendency to shed metal fibers.

12 Claims, 3 Drawing Figures

SCOURING PAD AND METHOD FOR PRODUCING SAME

BACKGROUND OF THE INVENTION

1. Field of the Invention

The present invention is related to metal fiber scouring pads and the method for producing such pads. More particularly, the invention is related to metal scouring pads where the amount of shedding of metal fibers is decreased by the use of a thermoplastic resin.

2. Prior Art

The use of metal wool pads as scouring implements has long been known. Such pads have been sold under trademarks such as "SOS" and "Brillo." One problem associated with such pads is the tendency of the pads to shed metal fibers. In an untreated pad, the fibers are held together only by friction, or also by the soap incorporated in the pad. The frictional and soap forces have not been adequate, particularly during use of the pads, to prevent shedding of the metal fibers. Also, it has been known to disperse a binding agent, particularly in liquid or plastic form, throughout the pad to help hold the fibers together, but considerable shedding still occurs. The problem of shedding fibers has been particularly pronounced in stainless steel wool pads, which are desirable scouring pads because of their higher resistance to corrosion.

SUMMARY OF THE INVENTION

The present invention has been designed to reduce the metal fiber shedding problem associated with metal fiber scouring pads. Accordingly, an object of this invention is the provision of a metal fiber scouring pad having a reduced tendency to shed fibers.

A further object of this invention is the provision of a metal fiber scouring pad having an increased resistance to corrosion.

A further object of this invention is the provision of a scouring pad which may be manufactured easily and efficiently.

A further object of this invention is the provision of a method for manufacturing a scouring pad having the above qualities.

The above objects and others are obtained by providing a metal fiber scouring pad in which the upper and lower surfaces of the pad are covered with a layer of a thermoplastic resin. The finished product is typically formed by taking a layer of a metal wool and disposing a sheet of a thermoplastic resin adjacent to the upper and lower surfaces of the metal wool. This assembly is then compressed at a temperature above the melting point of the thermoplastic resin so that the resin melts and adheres to the outer surfaces of the metal wool pad. The adherance of the resin to the metal wool fibers reduces fiber shedding in the resultant scouring pad. The above and other objects, advantages and features of the invention will be more readily discerned from the following detailed description of the invention which is provided in connection with the accompanying drawings.

DETAILED DESCRIPTION OF THE INVENTION

Figure 3:
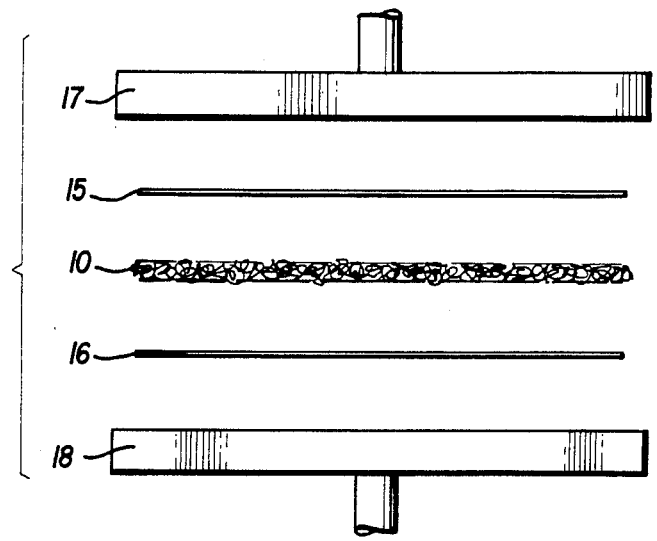
FIG. 3 shows one method of making the pad of FIG. 1.

Referring to the drawings, the scouring pad of the present invention includes an interior layer of randomly oriented metal fibers 10 (steel wool, stainless steel wool, bronze wool, copper wool, etc.). The pad includes distinct upper and lower layers 12 and 14. The layers 12 and 14 include randomly oriented metal fibers, which are bonded together by a thermoplastic resin. The resin coats the metal fibers, securing the fibers to one another, and also fills some of the spaces between fibers. The layers 12 and 14 have mat-like qualities while the layer 10, which is substantially free of resin, retains the resilient properties of the metal wool. Although the interior layer is substantially free of resin, because of the random orientation of the metal fibers, the fibers making up the interior layer may have one or both ends of the fiber held by the resin in layers 12 and 14, or they may be intertwined withh metal fibers in layers 12 and 14. It is only necessary that the length of the metal fiber in layer 10 not be coated with resin. Of course, some fibers will be completely within the layer 10.

Figure 1:
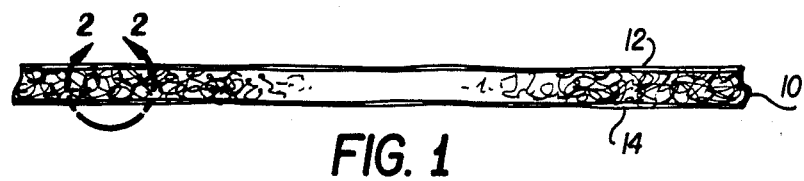
FIG. 1 shows a side view of a scouring pad according to the present invention.
Figure 2:
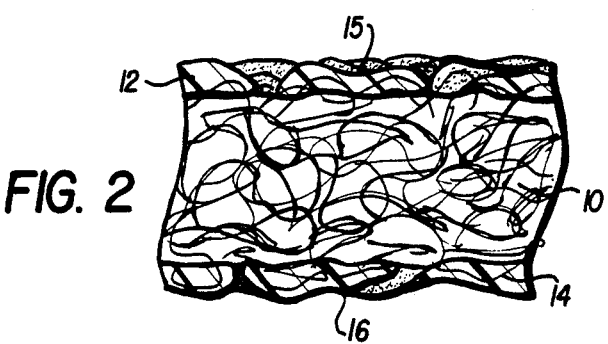
FIG. 2 shows an enlarged side view of the portion of the pad of FIG. 1.

With reference to FIG. 3, the pad of FIGS. 1 and 2 may be prepared by disposing a layer of metal wool 10 between layers 15 and 16 of a thermoplastic resin. The metal and thermoplastic layers are then compressed between the faces 17 and 18 of a press, and simultaneously heated to a temperature above the melting point of the resin. This may be accomplished, for example, by providing the press faces with heaters or by locating the press in an oven. The pressure and heat cause the thermoplastic resin to melt, and to flow a short distance toward the interior of the metal wool. However, since the resin initially is present in the form of a film or layer, it remains relatively concentrated near the surface of the metal wool, leaving the interior substantially free from the resin. Instead of using two separate layers of thermoplastic resin, the same results may be achieved by simply wrapping the metal wool with a single film or sheet of the thermoplastic resin. This accomplishes the effect of disposing a layer of resin adjacent to the top and the bottom surfaces of the metal wool.

After the pressing and heating step, the pad may be subjected to a further step of heating to a temperature above the melting point of the resin. This may be done in any known manner, for example, in an oven. This subsequent heating causes any resin flash to melt, thus providing a more uniform appearance.

Virtually any thermoplastic resin available in sheet form is suitable for use in the present invention. Two examples are ethylene and vinyl resins. Polyethylene is particularly preferred because of its availability, low cost and relatively low melting point. The present invention is particularly useful with stainless steel wool. The corrosion resistance of the metal is increased by having the outer surfaces coated with the resin.

A relatively high pressure is used for the compressing step, for example, about 1,000 psi. Of course, the temperature will depend upon the specific resin used. For polyethylene and vinyl resins, temperatures of about 300° to 400° are necessary. The amount of resin used will depend upon the desired strength of the final product. Generally, a sheet or film of resin about 1–4 mils.

thick will be used for pads including 3–6 grams of metal wool.

Because of the resin-coated surfaces, the final pad according to the present invention exhibits a much softer feel than an untreated pad. However, during use, the resin easily wears off of the portion of the pad actually involved in cleaning so there is no decrease in scouring effectiveness.

The following examples are presented to illustrate the present invention, which should not be construed as being limited thereby.

EXAMPLE 1

A layer of fine stainless steel wool weighing 3 grams for a 4 inch square pad was covered with a 1 mil film of polyethylene, weighing a total of about 0.5 grams. The steel wool and polyethylene was subjected to a pressure of 1,000 psi at a temperature of 325° F. for one minute. This caused the film to be bonded to the steel wool fibers. The assembly was then placed in a 325° oven for two minutes, melting the flashing and giving the pad a uniform appearance.

EXAMPLE 2

The process of Example 1 was repeated, except an extra layer of steel wool and double layers of polyethylene film were used. A thicker, heavier and stronger product was obtained as compared to the product of Example 1.

Although a detailed description of the present invention has been described above, many modifications can be made as will be apparent to those of ordinary skill in the art. Accordingly, the present invention is not limited by the foregoing description but is only limited by the scope of the claims appended hereto.

What is claimed is:

1. A method for producing a scouring pad, comprising:
   forming a layer of randomly oriented metal fibers;
   disposing a sheet of thermoplastic resin above and below said layer of metal fibers; and
   compressing said layer of metal fibers and said sheets of thermoplastic resin at a temperature above the melting point of said resin to form a scouring pad.

2. The method of claim 1, further comprising, further heating the compressed metal fibers and resin at a temperature above the melting point of said resin, after the completion of said compressing step.

3. The method of claim 1, wherein said resin is polyethylene.

4. The method of claim 3, wherein said sheet of thermoplastic resin has a thickness of 1 to 4 mils and is formed of polyethylene.

5. The method of claim 3, wherein said compressing takes place at a temperature of about 325° F.

6. The method of claim 5, wherein said compressing is carried out for about one minute at about 1,000 psi.

7. The method of claim 6, further comprising a step of heating at about 325° F. for about two minutes after said compressing step.

8. The method of claim 1, wherein said metal is steel.

9. The method of claim 1, wherein said metal is stainless steel.

10. A scouring pad formed by the method of claim 1.

11. A scouring pad comprising distinct, matlike top and bottom layers of randomly oriented metal fibers, each of said layers held together by a thermoplastic resin bonding said fibers to one another, said thermoplastic resin covering the upper and lower surfaces of the pad and filling at least some of the spaces between said fibers; and
    an interior layer of randomly oriented metal fibers substantially free of said resin.

12. The pad of claim 11, wherein said thermoplastic resin is polyethylene.

* * * * *